United States Patent [19]
Sheldon et al.

[11] 3,895,140
[45] July 15, 1975

[54] PRESERVED CUT GREEN FOLIAGE AND PROCESS THEREFOR

[75] Inventors: Charles P. Sheldon, Georgetown; Robert T. Sheldon, Deleon Springs, both of Fla.

[73] Assignee: Floral Greens International, Inc., DeLeon Springs, Fla.

[22] Filed: Dec. 18, 1973

[21] Appl. No.: 425,817

Related U.S. Application Data

[63] Continuation-in-part of Ser. No. 311,675, Dec. 29, 1972, abandoned.

[52] U.S. Cl. .......................... 428/22; 21/58; 47/58; 47/DIG. 2; 427/4
[51] Int. Cl. ............................................. A01n 3/00
[58] Field of Search ............... 161/29; 117/3; 21/58; 47/DIG. 4; 99/150 A

[56] References Cited
UNITED STATES PATENTS

| | | | |
|---|---|---|---|
| 1,484,656 | 2/1924 | Koropp et al. | 117/3 |
| 1,489,130 | 4/1924 | Koropp et al. | 117/3 |
| 2,026,873 | 1/1936 | Dux | 47/DIG. 2 |
| 2,581,299 | 1/1952 | Rogers | 47/DIG. 2 |

FOREIGN PATENTS OR APPLICATIONS

| | | | |
|---|---|---|---|
| 14,825 | 1897 | United Kingdom | 117/3 |
| 12,835 | 1900 | United Kingdom | 117/3 |

*Primary Examiner*—William E. Schulz
*Attorney, Agent, or Firm*—Morgan, Finnegan, Durham & Pine

[57] ABSTRACT

Preserved cut green foliage is prepared by extracting the normal fluids therefrom and imbibing a polyol in place thereof. Exposure of the preserved foliage to radiant energy induces attractive color changes therein, for example, from green to reddish orange. Dyed preserved foliage may also be produced.

18 Claims, No Drawings

PRESERVED CUT GREEN FOLIAGE AND PROCESS THEREFOR

Cross Reference to Related Application

This application is a continuation in part of copending application Ser. No. 311,675, filed Dec. 29, 1972, now abandoned.

This invention relates to preserved cut green foliage and to a process for its preparation. More particularly, it relates to removing the natural plant fluids from the green foliage tissue and replacement of the fluids in the tissue with a polyol, such as glycerine, to produce foliage which retains a pleasing color and does not wilt for relatively long times.

BACKGROUND OF THE INVENTION

Many methods have been proposed to preserve the form and structure of green foliage, i.e., stems, leaves, flowers, and other parts of plants, after cutting.

For example, cut green foliage can be dried in the air, pressed between blotting papers, or dried by burying in a mixture of finely divided materials such as corn meal and borax. Such methods leave the foliage unnaturally paper dry and fragile and the colors are faded.

On the other hand, the ends of the stems of cut green foliage can be crushed and then the crushed ends immersed in liquids so that the liquids move up into the other parts of the foliage to leave them pliable instead of paper dry. A typical method is described by K. B. Pozer in The Washington Post and Times, Oct. 24, 1954, in which the lower portion of stems of beech, baptista, Scotch broom, ivy and galax are immersed in solutions of hot water and from about 33 to about 50% by by volume of glycerine. E. C. Grayson in The New York Times, May 17, 1959, Section 2, page 24X, also describes such a process, in which cut stems are stood three inches deep in a solution of water and 33% by volume of glycerin. This treatment is said to be complete when the solution is absorbed to the leaf tips. Tests have shown, however, that most of the important types of cut green foliage do not preserve well under these conditions, either because the solution does not reach the leaf tips, e.g., leatherleaf fern simply wilts like any other untreated leaf; or the solution dehydrates the leaf but does not preserve it, e.g., palmetto fronds change to the characteristic color of dead, sun-dried palm leaves and become brittle in 48 hours. Eucalyptus leaves develop an uncharacteristic fairly dark brown color under these conditions.

A somewhat related method for producing preserved foliage is described by Koropp et al, U.S. Pat. No. 1,484,656. However, instead of using cut green foliage, the patentees use dried plant parts and subject them to immersion at normal temperatures in a bath comprising glycerine, water and formalin at a proportion of 10:89:1. After all of the pores and cells in the dried plant part have been saturated, with the solution, the foliage is said to attain a state of natural form, color, pliability and resiliance. The process of the patent has not been found effective to preserve cut green foliage, however.

It has now been discovered that if cut green foliage is totally immersed in a preservation solution of water and at least 40% by volume of a polyol, and at an elevated temperature, of at least 140°F., for a time sufficient to permit extraction of the normal plant fluids and replacement thereof with the polyol, and then if any remaining water is carefully removed by selective drying, superior preserved cut foliage is obtained. This discovery differs from the state of the art in that it requires total immersion of the foliage rather than just the cut stems; that the foliage be green rather than dry; that the treatment solution contain a substantial proportion of polyol; and that any remaining water be removed by selective drying to produce an article in which the sole replacement for natural plant fluids in the tissues is the water-free polyol.

Description of the Invention

According to the present invention, there is provided a process for preserving cut green foliage comprising:

i. immersing the whole body of said foliage within a preservation solution comprising water and from about 40 to about 60% by volume of a polyol selected from the group consisting of glycerine and mixtures of glycerine with polyglycerines at a temperature of between about 140°F. and the denaturing temperature of said foliage until the normal plant fluids have been extracted therefrom and said polyol has been substantially completely imbibed therewithin;

ii. removing the foliage from the preservation solution;

iii. removing excess preservation solution from the surface of the foliage; and iv. selectively drying the foliage to substantially completely remove the water but not the polyol therefrom.

Another feature of the present invention is to provide an article of manufacture comprising cut green foliage free of normal plant fluids and a polyol selected from the group consisting of glycerine and mixtures of glycerine and polyglycerines substantially completely in place of said normal plant fluids.

The cut green foliage can comprise any plant body or part which contains chlorophyll and natural plant fluids, both stems, leaves, flowers and the like being included, and the plants may be deciduous, evergreen, and the like, in nature. Illustratively, the cut gren foliage can be from beech, birch, ivy, baptista, Scotch broom, galax, goldenrod, wheat, lotus, mosses, ferns, eucalyptae, palms, oleanders, mayapples, junipers, and the like. Preferably, they will be cut green ferns, eucalyptae, palms, sequoia, juniperus, oleanders, mayapples and the like. Especially preferably, the cut green foliage will be a fern, and special mention is made of the leatherleaf fern (Polystichum adiantiforme).

Step (i) in the process is carried out by immersing the whole body of the cut green foliage entirely beneath the surface of the preservation solution. The preservation solution comprises water and between about 40% and 60% by volume of the polyol component. If less than 40% of polyol is present, the preservation is not successful because leaves, for example, tend to curl. More than 60% of polyol is not satisfactory because the solution does not appear to be imbibed at a sufficiently rapid rate. Preferably, the amount of glycerine in the polyol solution will be about 50% by volume of the solution, and the amount of polyol is maintained by making adjustments during the process after taking samples for analysis, e.g., by specific gravity measurement.

The temperature at which step (i) is carried out is important. A minimum temperature of about 140°F. is necessary because, below this temperature, the degree of preservation ultimately achieved is low. Morover, it is difficult to pump and transfer solutions below this temperature because their viscosity increases, and such higher viscosity may explain why the preservation process does not produce excellent results at lower temperatures. The maximum temperature will depend upon a number of factors, the critical one of which is the denaturing temperature of the cut green foliage. It is desired not to exceed a temperature in which the foliage becomes permanently, physically transformed into an undesirable state. In other words, cooking should be avoided. Generally, depending on the treatment time, the upper limit will be about 250°F. for short periods of time, e.g., under pressure (as will be described later), but for utmost safety, 180°F. will not be exceeded in most instances. Under atmospheric conditions, step (i) will be carried out preferably at a temperature between 140°F. and 170°F., and most preferably, at 160°F. Under these conditions, the extraction of the plant fluids or juices and replacement of the fluids with the polyol component will require from about 3 to about 72 hours over the widest temperature ranges; and from about 35 to about 55 hours over 140°F. to 160°F.

In a preferred embodiment, step (i) will be carried out in two stages, the first at atmospheric pressure and a temperature of up to about 170°F. and the second under autogenous pressure, in a sealed vessel, at temperatures of up to about 228° to about 250°F. The corresponding pressures are 5 – 15 psi. Under these conditions, denaturation does not seem to be a problem if the pressure is immediately released and heating is stopped when the end point (complete inbibement of the polyol) is reached. The optimum end point in most cases is 240°F./10 psi. The major advantage is that the time required to complete step (i) is substantially reduced, e.g., from 35 – 55 hours down to 6 hours.

The polyol used in the preservation solution of step (i) has several important characteristics. It must be miscible with water in the proportions called for and it must be normally fluid. Useful for this purpose are glycerine, natural or synthetic, and two polyol preparations made by Dow Chemical, Midland, Michigan, U.S.A. These are un-refined glycerine products called Polyol RG and Polyol 80. They are identical in their chemical formulation, each containing predominantly, e.g., 80%, glycerine and a minor amount, e.g., 20%, of condensed glycerines, i.e., polyglycerines, which have been identified by the manufacturer as having 2-5 glycerine condensed units, i.e., glycerine ethers, interchangeably. Surprisingly, the following polyols are ineffective to secure all of the advantages outlined above: trimethylol propane, pentaerythritol, sorbitol and propylene glycol. Trimethylol propane produced treated green foliage which wilted within 24 hours after drying; pentaethritol did not appear to be absorbed by the plant tissues, sorbitol wilted the foliage and propylene glycol produced curled and distorted foliage.

Step (ii) in the process is carried out simply by removing the foliage from the preservation solution; baskets or other types of containers can be used in batch operations, or the fluid can be drained away from the foliage in others, or the foliage can be transferred out of the baths in continuous process, e.g., on moving belts and the like.

Step (iii) calls for removing excess preservation solution from the surface foliage and this can be carried out in any convenient manner, e.g., by draining, or rinsing in water baths, or with water sprays, and the like. It is most convenient simply to rinse in clean water.

Step (iv) is important in that it calls for selectively removing any remaining water from the surface and from the tissues of the foliage, while leaving the polyol in the tissues, substantially free of water. With the polyols used, selective water removal is easy if the foliage is kept at a temperature of up to about 100°F. and at a low relative humidity, e.g., of between about 15 and 60%. This process may require from several hours to several days, lower humidities favoring shorter times. Even shorter times can be achieved if selective water removal is carried out in a microwave desiccator, or by exposure to infrared radiation.

The preserved foliage obtained as described herein can be used for many purposes, e.g., to decorate homes and buildings, gardens, for display purposes, and for educational and instruction purposes in schools, and the like.

The preserved foliage of this invention is also uniquely adapted to a treatment with radiant energy, e.g., sunlight, during which it is possible to induce attractive color changes. For example, the preserved foliage can be inserted into ventilated plastic bags and exposed to sunlight. After three hours, the green changes to a reddish orange. Longer exposure causes the color to change to maroon and the entire procedure, especially with deciduous foliage, mimics the Fall color change of common knowledge and experience.

The preserved foliage of this invention can also be dyed to any desired color, by infusing the pigments into the treating solution and preserving them and then treating the decolorized and preserved foliages with a vegetable dye, e.g., at a rate of 25 lbs. of dye per 100 gallons of 50% glycerine solution for periods of 5 to 60 minutes at temperatures of about 140°F.

DESCRIPTION OF THE PREFERRED EMBODIMENTS

The following examples illustrate the process and describe articles produced according to the present invention. They are for the purpose of explaining the invention and are not to be construed to limit its scope in any manner whatsoever.

EXAMPLE 1

Leatherleaf fern leaves are cut and wholly immersed in an open tray containing water and 50% by volume of glycerine at 160°F. and, at intervals, observations are made of the shape of the leaves, the color, the glycerine saturation time (point when the leaf changes in density from lighter than the solution to heavier), and the general appearance.

After about 1 hour, a slight curl develops in the leaves, but this opens up to normal shape after 24 hours. The foliage becomes yellow in 12 hours and brown after 24 hours. At 12 hours, the foliage is saturated with glycerine. The general appearance is unsatisfactory at intervals of 5 minutes and 1 hour, but is rated satisfactory at 12 hours. After 24 hours, the appearance is still rated satisfactory (leaves not curled) and the satisfactory rating remains throughout the rest of the heating period, up to 72 hours. Removal of the foliage after 48 hours, rinsing with water for 2 minutes and air drying at 68° – 72°F. at relative humidity of 50 to 60% produces attractive, preserved fern foliage.

For comparison purposes, the lower 2 inches of leatherleaf fern stems are crushed sufficiently to rupture the case and to exude some of the moisture but not sufficiently to break off the crushed portion. These are then stood vertically in solutions of water and 50% by volume of glycerine at 160° and at 70°F., and the same observations are made. Only the crushed portions are in contact with the solutions. The immersed parts of the stems are seen to become imbibed with glycerine in 24 hours and, in the 160°F. bath, only about 1 inch of the leaf, measured from the immersed portion, imbibes the glycerine. Both ferns simply wilt like any other untreated fern.

EXAMPLE 2

The procedure of Example 1 is repeated, substituting for the preservation solution employed therein a solution of water and 60% by volume of an 80% glycerine — 20% polyglycerine (Dow Chemical, Polyol RG). Preserved cut ferns according to this invention are produced.

EXAMPLE 3

The procedure of Example 1 is repeated, substituting for the preservation solution employed therein a solution of water and 60% by volume of an 80% glycerine — 20% polyglycerine (Dow Chemical, Polyol 80). Preserved cut ferns according to this invention are obtained.

EXAMPLE 4

A 1,000 gallon vat is provided with a suitable heater and temperature controllers and filled with a preservation solution of water and 50% by volume of glycerine maintained between 140° and 170°F. About 900 – 1,000 sprays of fresh cut leatherleaf fern, grown in DeLeon Springs, Florida, are loaded into each of ten trays 4 feet wide, 8 feet long and 3 inches deep having bottoms of ½ inch expanded metal screening, or in a metal basket 4 feet wide, 8 feet long and 3½ feet deep capable of containing 15,000 leaves. The trays, or basket, are loaded into the vat so that the stems and leaves are fully exposed to the preservative solution which is kept moving with a recirculation pump. Water and glycerine compositions are adjusted during the next 24 to 48 hours, during which time the plant fluids are infused into the fluid and glycerine is imbibed into the tissues. Following this treatment, the ferns are removed from the vats and then taken to the rinse stage where they are washed with water to remove any surface traces of solution. Then the washed ferns are transferred to a drying stage where they are heated at 100°F. and a relative humidity of 19 – 50% to remove all water on the surface and any within the plant tissues. These are produced preserved cut green ferns according to this invention, in which glycerine has substantially completely replaced the normal plant fluids.

As an optional step, the preserved ferns are inserted into ventilated plastic bags and placed on sun racks, or are placed in a climate-controlled, Tedlar-treated fiberglass greenhouse, and exposed to sunlight for 3 or more hours on each side of the leaf. This exposure changes the color to a pleasing reddish orange.

EXAMPLE 5

Leatherleaf fern foliage is wholly immersed in a solution comprising water and 50% by volume of glycerine at 150° to 160°F., then the temperature is gradually raised to 170°F., where it is maintained for a period of 2 to 10 hours at which time the foliage has been dehydrated and has just begun to imbibe glycerine. Then the lid of the reactor is sealed in place and the temperature is rapidly elevated to 240°F. resulting in a pressure within the reactor of 10 psi., then the reactor is vented and the vessel is depressurized. The foliage is rinsed in clean water and selectively dried as described in Example 1, or in a microwave desiccator, or through exposure to infrared radiation.

The first process step is completed in approximately 6 to 12 hours, in contrast to the 24 to 48 hours required for this step in open vats, according to Example 4.

EXAMPLES 6 – 10

The procedure of Example 5 is repeated with cut green foliage from the following plants:
Eucalyptus;
Palmetto palm fans;
Nerium oleander;
Podocarpus nagi (mayapples);
Pacific coast redwood; and
Pacific coast cedar.

Preserved cut green foliage according to this invention is obtained in each case.

EXAMPLE 11

Cut green foliages can be preserved and dyed with artificial vegetable dyes to give any desired color. Decolorization of the foliage is obtained in the first part of the process by immersion of the foliage in a solvent, such as methanol (methyl alcohol), acting over the course of 6 to 24 hours, without heat; or by extracting the foliage in a 50% glycerine solution for 6 or more hours, at 140°F. In the former instance, eucalyptus, leatherleaf fern and redwood infuse their chlorophyll pigments into the solvent solution. In the latter instance, the pigments of cedar are infused into the glycerine solution during the extracting process.

Eucalyptus, leatherleaf fern and redwood are then preserved by treatment in a vat of 50% glycerine solution at 140°F. temperature for 3 hours. Cedar is preserved while its pigments are being infused into the solution as outlined above.

The above described, decolorized and preserved, foliages can then be artifically colored by treating them in dye vats containing vegetable (Rit) dyes, at the rate of 25 pounds to 100 gallons of 50% glycerine solution for periods of 5 to 60 minutes at a temperature of 140°F.

The above specific examples demonstrate that the method of this invention provides preserved cut green foliage efficiently and economically. Obviously, many variations in the method will suggest themselves to those skilled in the art in the light of the above detailed description. The invention in all of its obvious variations is intended to be defined in the appended claims.

We claim:

1. A process for preserving cut green foliage comprising:
   i. immersing the whole body of said foliage within a preservation solution comprising water and from about 40 to about 60% by volume of a polyol selected from the group consisting of glycerine and mixtures of glycerine with a polyglycerine at a temperature of between about 140°F. and the denaturing temperature of said foliage until the normal plant fluids have been extracted therefrom and said polyol has been substantially completely imbibed therewithin;

ii. removing the foliage from the preservation solution;

iii. removing excess preservation solution from the surface of the foliage; and iv. selectively drying the foliage to substantially completely remove the water but not the polyol therefrom.

2. A process as defined in claim 1 wherein said cut green foliage is selected from the group consisting of fern, eucalyptus, palms, sequoia, juniperus, oleanders, mayapples, and the like.

3. A process as defined in claim 2 wherein said cut green foliage is a fern.

4. A process as defined in claim 3 wherein said fern is a leatherleaf fern (Polystichum adiantiforme).

5. A process as defined in claim 1 wherein step (i) is carried out at atmospheric pressure and at a temperature of from about 140° to about 170°F.

6. A process as defined in claim 5 wherein the temperature in step (i) is about 160°F.

7. A process as defined in claim 1 wherein said preservation solution comprises water and glycerine.

8. A process as defined in claim 7 wherein said preservation solution comprises water and about 50% by volume of glycerine.

9. A process as defined in claim 1 wherein step (i) is carried out for a period of from about 3 to about 72 hours; step (iii) is carried out by rinsing with water; and step (iv) is carried out by selectively drying at temperatures of up to 100°F. at relative humidities of between about 15 and about 60%.

10. A process as defined in claim 8 wherein step (i) is carried out at a temperature of from about 140°F. to about 160°F. for from about 35 to about 55 hours; step (iii) is carried out by rinsing with water; and step (iv) is carried out by selectively drying at temperatures of up to 100°F. at relative humidities of between about 15 and about 60%.

11. A process as defined in claim 1 wherein step (i) is carried out in two stages comprising:

a. immersing the foliage in said preservation solution at atmospheric pressure and at a temperature of from about 140° to about 170°F. until the normal plant fluids have been extracted therefrom; and b. thereafter heating the foliage and said preservation solution under autogenous pressure until the temperature reaches from about 228° to about 250°F. and the polyol has been substantially completely imbibed by the foliage, terminating the heating and immediately reducing the pressure to atmospheric.

12. A process as defined in claim 11 wherein the first stage is carried out at atmospheric pressure and at a temperature which is gradually increased from an initial range of from about 140° to about 160°F. to a final temperature of about 170°F. and then in the second stage, the temperature is rapidly increased under autogenous pressure to about 240°F., whereupon the pressure is immediately released and heating is discontinued.

13. A process as defined in claim 1 including the step of exposing the preserved cut green foliage to radiant energy to effect a change in color.

14. A process as defined in claim 13 wherein the preserved cut green foliage is exposed to sunlight until the color becomes at least a reddish orange.

15. An article of manufacture comprising cut green foliage free of normal plant fluids and a polyol selected from the group consisting of glycerine and mixtures of glycerine with a polyglycerine substantially completely in place of said normal plant fluids.

16. An article as defined in claim 15 wherein said polyol is glycerine.

17. An article as defined in claim 15 wherein said foliage is leatherleaf fern stems and leaves and said polyol is glycerine.

18. An article as defined in claim 15 wherein said foliage includes a dye of a pre-determined color.

* * * * *